(12) United States Patent
Guler et al.

(10) Patent No.: US 11,662,302 B2
(45) Date of Patent: May 30, 2023

(54) CALIBRATION OF OPTICAL DETECTOR

(71) Applicant: Carrier Corporation, Palm Beach Gardens, FL (US)

(72) Inventors: Urcan Guler, Avon, CT (US); David L. Lincoln, Cromwell, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/059,940

(22) PCT Filed: Dec. 6, 2019

(86) PCT No.: PCT/US2019/064902
§ 371 (c)(1),
(2) Date: Nov. 30, 2020

(87) PCT Pub. No.: WO2020/123290
PCT Pub. Date: Jun. 18, 2020

(65) Prior Publication Data
US 2021/0364422 A1    Nov. 25, 2021

Related U.S. Application Data (60) Provisional application No. 62/778,105, filed on Dec. 11, 2018.

(51) Int. Cl.
  *G01N 21/53* (2006.01)
  *G01N 21/27* (2006.01)
  *G08B 29/22* (2006.01)
(52) U.S. Cl.
  CPC ........... *G01N 21/274* (2013.01); *G01N 21/53* (2013.01); *G08B 29/22* (2013.01)

(58) Field of Classification Search
  CPC ..... G01N 21/274; G01N 21/53; G08B 17/107
  See application file for complete search history.

(56) References Cited

U.S. PATENT DOCUMENTS

| 3,585,621 | A |   | 6/1971  | Dicello et al. |
| 3,693,401 | A |   | 9/1972  | Purt et al. |
| 3,949,234 | A | * | 4/1976  | Vandermark ........ G01N 21/534 340/630 |
| 4,099,178 | A |   | 7/1978  | Ranney et al. |
| 4,249,244 | A |   | 2/1981  | Shofner et al. |
| 4,306,575 | A |   | 12/1981 | Minozzi, Jr. |

(Continued)

FOREIGN PATENT DOCUMENTS

| CN | 2182407 U | 11/1994 |
| CN | 2462380 U | 11/2001 |

(Continued)

OTHER PUBLICATIONS

International Preliminary Report on Patentability; International Application No. PCT/US2019/063517; International Filing Date Nov. 27, 2019; dated Jun. 24, 2021; 9 pages.

(Continued)

*Primary Examiner* — David P Porta
*Assistant Examiner* — Fani Polyzos Boosalis
(74) *Attorney, Agent, or Firm* — Cantor Colburn LLP (57) ABSTRACT

A method of calibrating an optical detector includes positioning a calibration block relative to the optical detector and determining a first calibration point of the detector using the calibration block.

17 Claims, 9 Drawing Sheets

(56) References Cited

U.S. PATENT DOCUMENTS

| | | | |
|---|---|---|---|
| 4,870,394 | A | 9/1989 | Corl et al. |
| 5,123,738 | A | 6/1992 | Yonemura |
| 5,413,915 | A | 5/1995 | Case et al. |
| 5,473,314 | A | 12/1995 | Mochizuki et al. |
| 5,497,144 | A | 3/1996 | Schappi et al. |
| 5,670,946 | A | 9/1997 | Ellwood et al. |
| 6,396,405 | B1 | 5/2002 | Bernal et al. |
| 6,692,916 | B2 | 2/2004 | Bevilacqua et al. |
| 7,111,496 | B1 | 9/2006 | Lilienfeld et al. |
| 7,167,098 | B2 | 1/2007 | Siber et al. |
| 7,212,734 | B2 | 5/2007 | Pepper et al. |
| 7,224,284 | B2 | 5/2007 | Mi et al. |
| 7,587,926 | B2 | 9/2009 | Ackerman |
| 7,616,126 | B2 | 11/2009 | Kadwell et al. |
| 8,205,478 | B1 | 6/2012 | Hallisey |
| 8,896,835 | B2 | 11/2014 | Ido et al. |
| 8,937,718 | B2 | 1/2015 | Sieg et al. |
| 9,183,737 | B1 | 11/2015 | Billman |
| 9,652,958 | B2 | 5/2017 | Zribi et al. |
| 2001/0038338 | A1* | 11/2001 | Kadwell ............... G08B 29/24 340/630 |
| 2003/0001746 | A1 | 1/2003 | Bernal et al. |
| 2006/0007010 | A1* | 1/2006 | Mi ........................ G08B 29/20 340/630 |
| 2009/0075248 | A1* | 3/2009 | Debreczeny ........... G01N 21/51 435/39 |
| 2009/0188296 | A1 | 7/2009 | D'Amico et al. |
| 2010/0315638 | A1 | 12/2010 | Goohs et al. |
| 2012/0140231 | A1* | 6/2012 | Knox .................. G01N 15/1434 356/442 |
| 2012/0242993 | A1 | 9/2012 | Schick et al. |
| 2018/0149578 | A1 | 5/2018 | Walls et al. |
| 2018/0275052 | A1* | 9/2018 | Walsh .................. G01N 21/645 |
| 2019/0346356 | A1 | 11/2019 | Karnik et al. |
| 2021/0302311 | A1 | 9/2021 | Guler et al. |
| 2021/0372922 | A1 | 12/2021 | Guler et al. |

FOREIGN PATENT DOCUMENTS

| | | | |
|---|---|---|---|
| CN | 102998425 | A | 3/2013 |
| CN | 103514723 | A | 1/2014 |
| CN | 104637234 | A | 5/2015 |
| CN | 105938649 | A | 9/2016 |
| CN | 107543613 | A | 1/2018 |
| DE | 102009046556 | A1 | 5/2011 |
| EP | 1376506 | A1 | 1/2004 |
| EP | 2600139 | A1 * | 6/2013 ............. B21D 5/002 |
| EP | 2600139 | A1 | 6/2013 |
| EP | 2846150 | A1 | 3/2015 |
| EP | 2873964 | A1 | 5/2015 |
| GB | 2095821 | A | 10/1982 |
| GB | 2283727 | B | 5/1995 |
| GB | 2557246 | A | 6/2018 |
| JP | 2006024064 | A | 6/2005 |
| JP | 5167047 | B2 | 3/2013 |
| JP | 6266047 | B2 | 1/2018 |
| KR | 101736765 | B1 | 5/2017 |
| WO | 9502230 | A1 | 1/1995 |
| WO | 2008111895 | A1 | 9/2008 |
| WO | 2017060716 | A1 | 4/2017 |
| WO | 2018069473 | A1 | 4/2018 |

OTHER PUBLICATIONS

International Preliminary Report on Patentability; International Application No. PCT/US2019/063522; International Filing Date Nov. 27, 2019; dated Jun. 24, 2021; 10 pages.
International Preliminary Report on Patentability; International Application No. PCT/US2019/064902; International Filing Date Dec. 6, 2019; dated Jun. 24, 2021; 9 pages.
JK Exports Defusing Dangers—Solo Detector Testers. Smoke Detector Testing. Retrieved from https://jkexportsindia.co.in/detector-testers?gclid=EAlalQobChMI_-X6w62o3QIVIY2PCh1dpA5PEAAYASAAEgLKm_D_BwE. Date Accessed: Sep. 19, 2018. 9 Pages.
Killeen et al. "Alternative Calibration Process for Optical Smoke Detectors", Aug. 23, 2012, Worcester Polytechnic University, 57 pages.
International Search Report of the International Searching Authority; International Application No. PCT/US2019/063517; International Filing Date: Nov. 27, 2019; dated Feb. 28, 2020; 4 pages.
International Search Report of the International Searching Authority; International Application No. PCT/US2019/063522; International Filing Date: Nov. 27, 2019; dated Feb. 28, 2020; 6 pages.
International Search Report of the International Searching Authority; International Application No. PCT/US2019/064902; International Filing Date: Dec. 6, 2019; dated Mar. 9, 2020; 6 pages.
Written Opinion of the International Searching Authority; International Application No. PCT/US2019/063517; International Filing Date: Nov. 27, 2019; dated Feb. 28, 2020; 7 pages.
Written Opinion of the International Searching Authority; International Application No. PCT/US2019/063522 International Filing Date: Nov. 27, 2019; dated Feb. 28, 2020; 10 pages.
Written Opinion of the International Searching Authority; International Application No. PCT/US2019/064902; International Filing Date: Dec. 6, 2019; dated Mar. 9, 2020; 9 pages.
U S. Non-Final Office Action; U.S. Appl. No. 15/734,120; dated Apr. 11, 2022; 27 pages.
U.S. Non-Final Office Action; U.S. Appl. No. 17/059,944; dated May 11, 2022; 33 pages.
U.S. Final Office Action; U.S. Appl. No. 15/734,120; dated Aug. 30, 2022; 19 pages.
U.S. Non-Final Office Action; U.S. Appl. No. 15/734,120; dated Nov. 22, 2022; 15 pages.

* cited by examiner

CALIBRATION OF OPTICAL DETECTOR

CROSS REFERENCE TO RELATED APPLICATIONS

This application is a National Stage application of PCT/US2019/064902, filed Dec. 6, 2019, which claims priority to U.S. Provisional Application 62/778,105 filed Dec. 11, 2018, both of which are incorporated by reference in their entirety herein.

BACKGROUND

Embodiments of the present disclosure described herein generally relate to smoke detectors and, more particularly, to systems and methods for verifying operational integrity of optical smoke detectors.

Smoke detectors exist including a light source that produces and emits a light beam into an area being monitored. A photo detector is positioned to receive light that is scattered by smoke particles from the area being monitored. A processing circuit is associated with the light source and the photo detector to measure the amount of light received and evaluate whether one or more smoke particles are present.

The various components of the smoke detector contribute to the sensitivity of the detector and as a result, at the time of manufacture, the smoke detector requires calibration. Some of the main factors that lead to significant tolerance variations include the output of the LED light source and the orientation of the one or more light sources relative to the photo detector. Currently, smoke detectors are calibrated using "smoke boxes." The detector is installed within an enclosed chamber and is operated to sense the presence of the smoke surrounding the detector within the enclosure. This process is cumbersome, time consuming, and is not fully automated. Accordingly, there is a need for a system that will minimize the time required to calibrate a smoke detector.

BRIEF DESCRIPTION

According to an embodiment, a method of calibrating an optical detector includes positioning a calibration block relative to the optical detector and determining a first calibration point of the detector using the calibration block.

In addition to one or more of the features described above, or as an alternative, in further embodiments determining the first calibration point of the detector further comprises emitting a light from at least one light source of the detector, receiving scattered light from the calibration block at at least one light sensing device, determining an obscuration based on the scattered light, and comparing the obscuration with an allowable range.

In addition to one or more of the features described above, or as an alternative, in further embodiments comprising adjusting at least one parameter of the detector if the obscuration is outside the allowable range.

In addition to one or more of the features described above, or as an alternative, in further embodiments positioning the calibration block relative to the optical detector includes mounting a primary surface of the calibration block in direct contact with a surface of the optical detector.

In addition to one or more of the features described above, or as an alternative, in further embodiments positioning the calibration block relative to the optical detector includes mounting the calibration block within at least one sensing volume of the optical detector.

In addition to one or more of the features described above, or as an alternative, in further embodiments the method of calibrating the optical detector occurs at a calibration station of a manufacturing line.

In addition to one or more of the features described above, or as an alternative, in further embodiments the optical detector is manufactured on the manufacturing line.

In addition to one or more of the features described above, or as an alternative, in further embodiments comprising positioning a second calibration block relative to the optical detector and determining a second calibration point of the optical detector using the second calibration block.

In addition to one or more of the features described above, or as an alternative, in further embodiments determining a second calibration point of the optical detector further comprises emitting light from the at least one light source of the detector, receiving scattered light from the second calibration block at the at least one light sensing device, and determining a second obscuration based on the scattered light, and comparing the second obscuration with a second allowable range.

In addition to one or more of the features described above, or as an alternative, in further embodiments positioning the second calibration block relative to the optical detector further comprises removing the calibration block.

In addition to one or more of the features described above, or as an alternative, in further embodiments comprising positioning a third calibration block relative to the optical detector and determining a third calibration point of the optical detector using the third calibration block.

According to an embodiment, a calibration block for use with a detector includes a body including a base material and a plurality of particles mixed within the base material such that the body has a known obscuration.

In addition to one or more of the features described above, or as an alternative, in further embodiments the known obscuration is representative of a presence of aerosolized particulates.

In addition to one or more of the features described above, or as an alternative, in further embodiments the aerosolized particulates are representative of a light colored smoke.

In addition to one or more of the features described above, or as an alternative, in further embodiments the aerosolized particulates are representative of a dark colored smoke.

In addition to one or more of the features described above, or as an alternative, in further embodiments a coating is applied to at least a portion of an exterior surface of the calibration block.

In addition to one or more of the features described above, or as an alternative, in further embodiments the coating is an anti-reflective coating.

In addition to one or more of the features described above, or as an alternative, in further embodiments the coating is an absorptive coating.

In addition to one or more of the features described above, or as an alternative, in further embodiments the detector includes at least one sensing volume, and the calibration block is sized to extend through the at least one sensing volume.

In addition to one or more of the features described above, or as an alternative, in further embodiments a first surface of the calibration block is positionable in direct contact with a surface of the detector, the first surface having a contour complementary to the surface of the detector.

In addition to one or more of the features described above, or as an alternative, in further embodiments the base material is optically transparent.

In addition to one or more of the features described above, or as an alternative, in further embodiments the plurality of particles are coated to prevent the plurality of particles from adhering to one another.

In addition to one or more of the features described above, or as an alternative, in further embodiments a type, size and geometry of the plurality of particles are selected to achieve the known obscuration.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Referring now to the FIGS., an example of an optical detector 20 for detecting one or more conditions or events within a designated area to be monitored is illustrated. In the illustrated, non-limiting embodiment, the detection apparatus 20 is a chamber-less smoke detector. It will be appreciated that a chamber-less smoke detector, where smoke is detected in the ambient adjacent to and outside of the detector rather than in a chamber within the body of the detector (as in a chambered detector), may provide additional benefits including, but not limited to reduction of transport time for smoke to reach the sensor elements to enable faster response/alarm times, improved sensitivity, increased functionality (as described below), manufacturability, and reproducibility, negligible directionality, ease of maintenance, and enhanced aesthetics for example. Additionally, it should be understood that in some embodiments the detector 20 may be able to detect one or more hazardous conditions, including but not limited to the presence of smoke, fire, temperature, flame, or any of a plurality of pollutants, combustion products, or chemicals. Alternatively, or in addition, the detector 20 may be configured to perform monitoring operations of people, lighting conditions, or objects. In an embodiment, the detector 20 may operate in a manner similar to a motion sensor, such as to detect the presence of a person, occupants, or unauthorized access to the designated area for example. The conditions and events described herein are intended as an example only, and other suitable conditions or events are within the scope of the disclosure.

The optical detector 20 uses light to evaluate a volume for the presence of a condition. In this example, light is emitted into the designated area being monitored; when the light encounters an object (a person, smoke particle, or gas molecule for example), the light is scattered and/or absorbed due to a difference in the refractive index of the object compared to the surrounding medium (air). Observing any changes in the incident light can provide information about the designated area including determining the presence of a predetermined condition or event.

Figure 1:
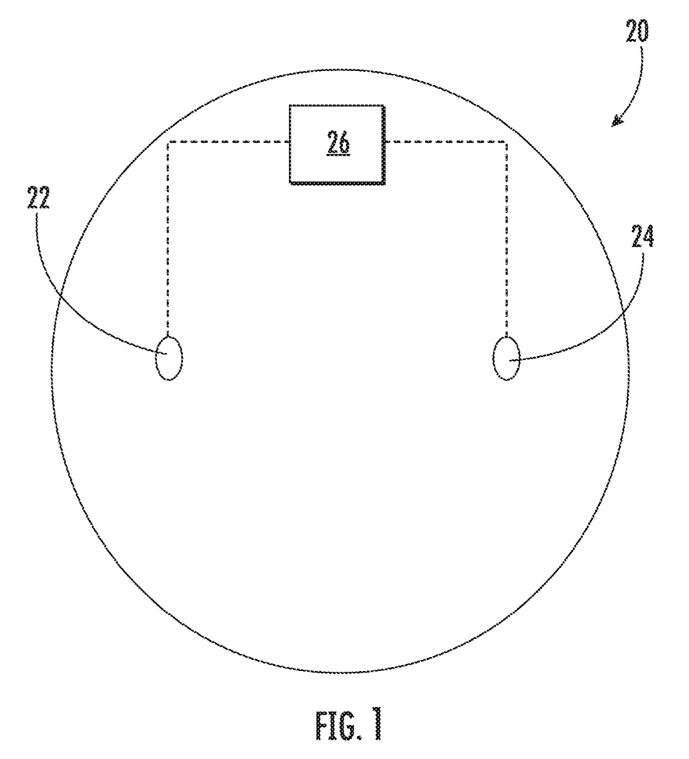
FIG. 1 is a schematic diagram of a chamberless optical detector according to an embodiment.

In its most basic form, as shown in FIG. 1, the detector 20 includes a light source 22, such as a light emitting diode (LED) for example, and a light sensing device 24, such as a photodiode for example. A processing device 26 is arranged in electrical communication with the at least one light source 22 and the at least one light sensing device 24. The processing device 26 includes a memory (not shown) capable of storing executable instructions. The executable instructions may be stored or organized in any manner and at any level of abstraction, such as in connection with one or more applications, processor, or routines, to analyze the signals detected by the plurality of sensors to make alarm decisions after preset threshold levels are reached according to the method described herein.

Figure 2:
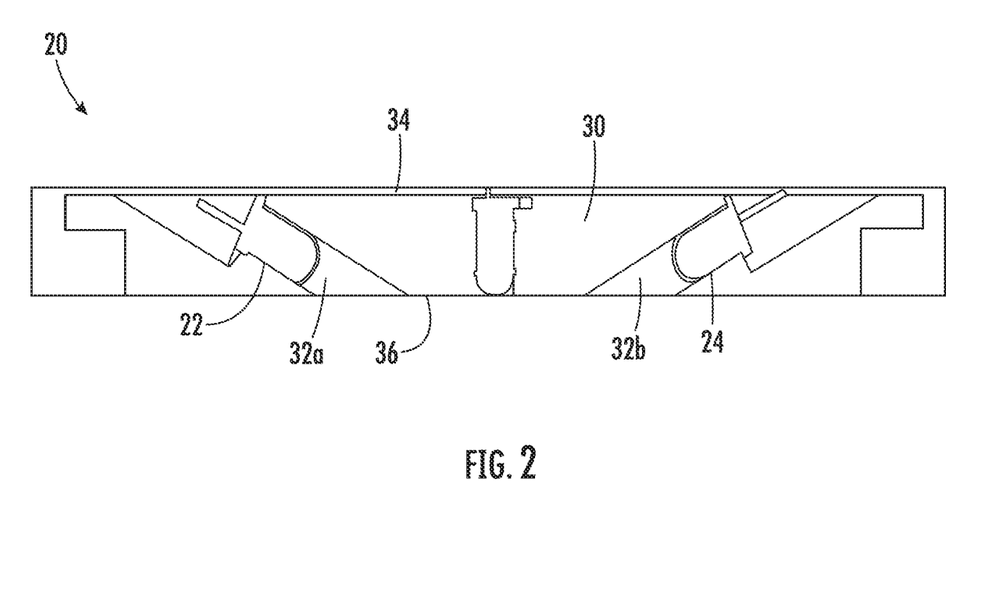
FIG. 2 is cross-sectional view of a chamberless optical detector according to an embodiment.

With reference now to FIG. 2, a cross-sectional view of the optical detector 20 is illustrated. As shown, the detector 20 further comprises a body or casing 30 having a plurality of channels 32 formed therein. The plurality of channels 32 extend generally from a first surface 34 of the body 30 to a second, opposite surface 36 of the body 30. The first surface 34 of the body 30 is typically positioned adjacent a supporting surface, such as a wall or ceiling for example, and the second surface 36 of the body 30 is typically arranged in communication with the area being monitored to determine the existence of a condition or event.

Each light source 22 may be mounted within one of the plurality of channels. In the illustrated, non-limiting embodiment, the light source 22 is mounted within a first channel 32a. Similarly, each of the one or more light sensing devices 24 is positioned within another of the plurality of channels 32 to receive light such that the portion of the at least one light sensing device 24 configured to receive a light signal is facing the second surface 36 and the area to be monitored. As shown, the light sensing device is positioned within a second channel 32b distinct from the first channel 32a containing the light source 22.

Figure 3A:
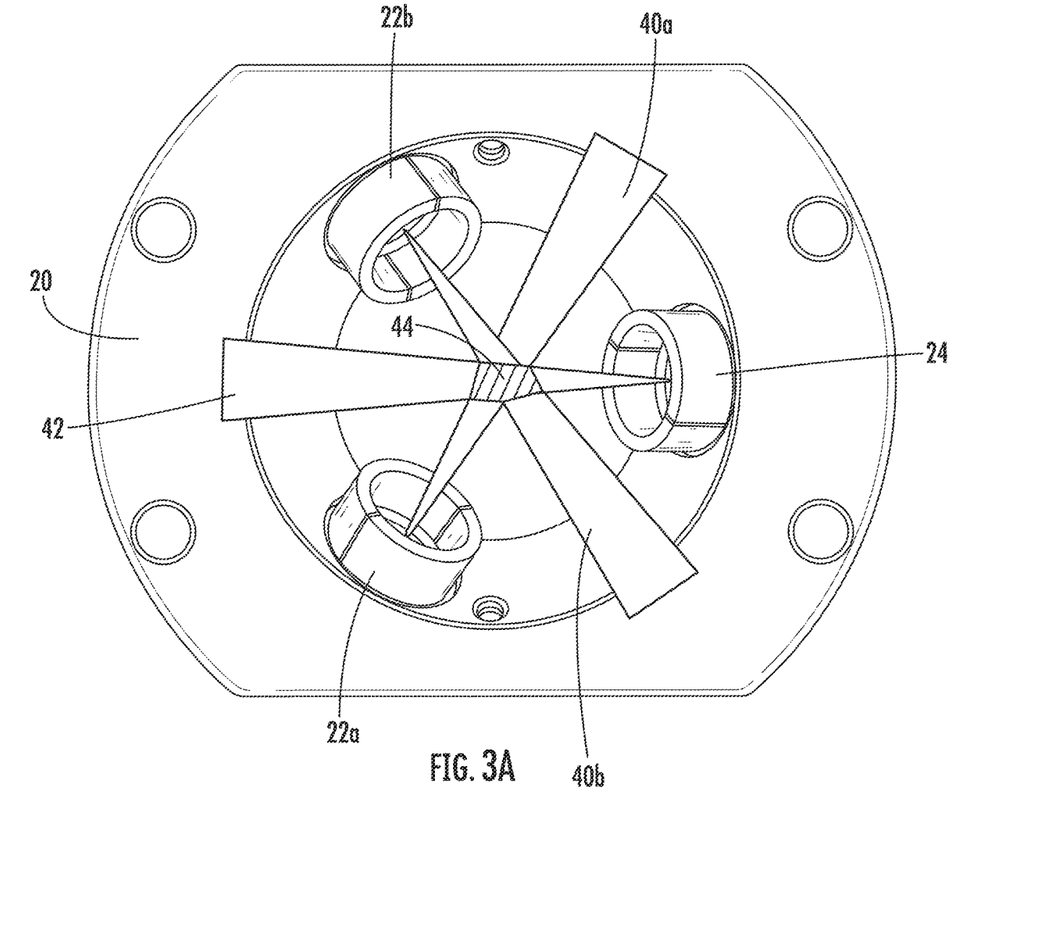
FIGS. 3A-3C are various views of the interaction between the emitter cones and receiving cones of the chamberless optical detector according to an embodiment.
Figure 3B:
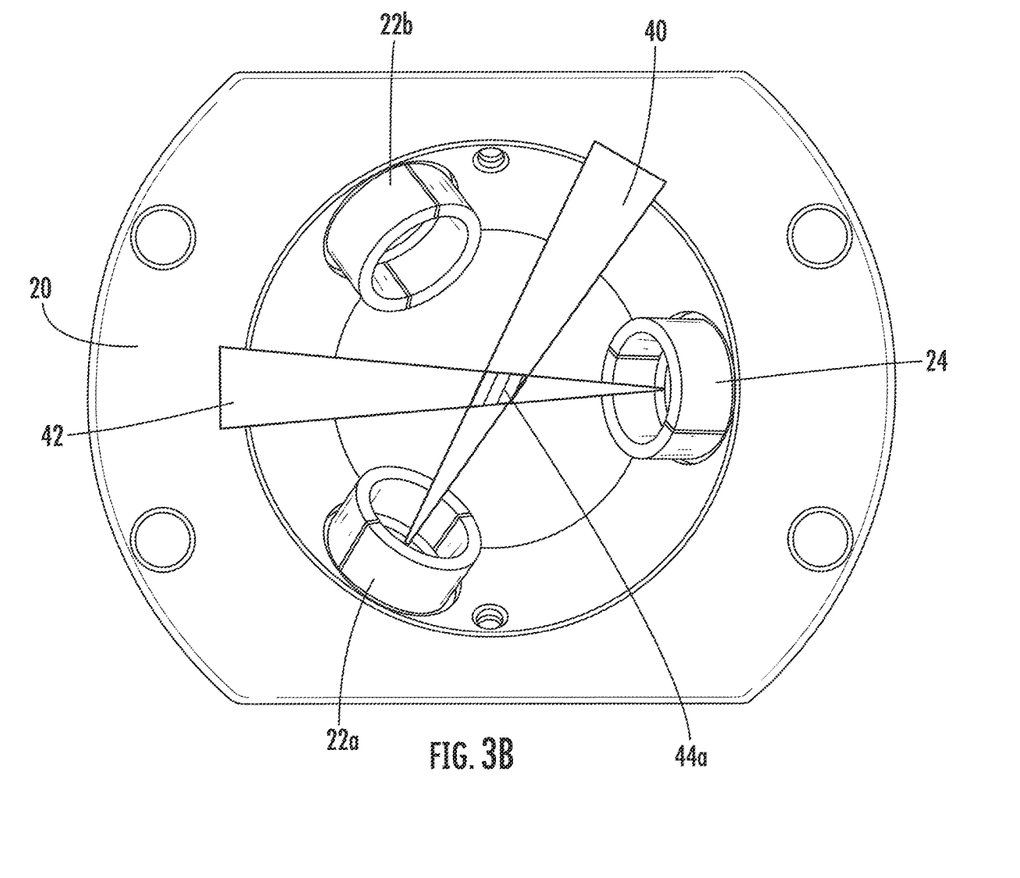
Figure 3C:
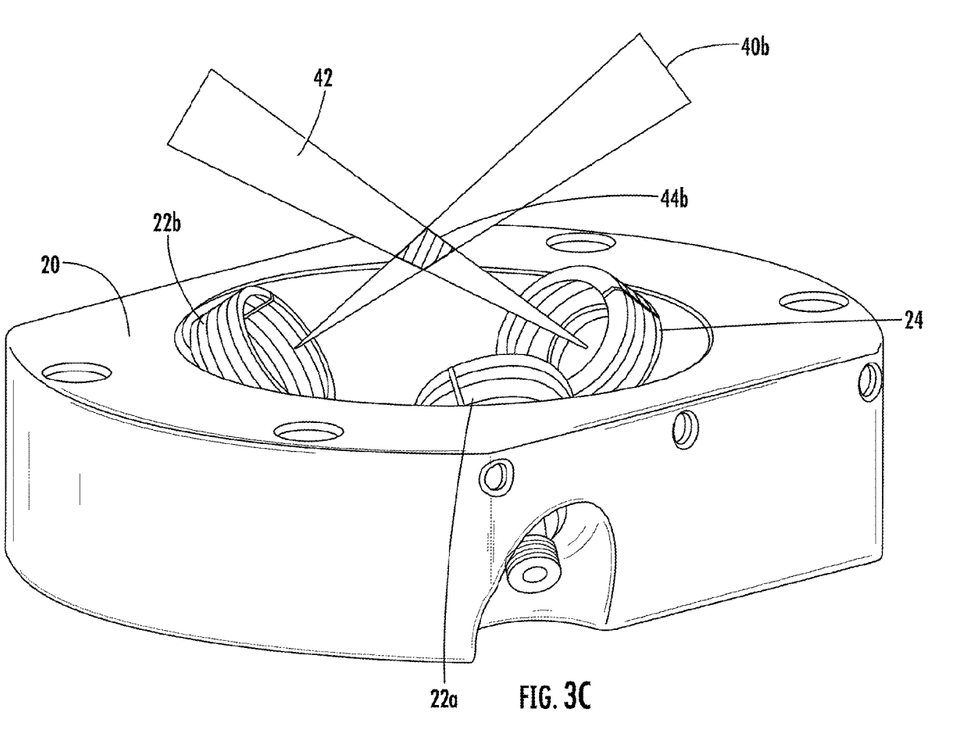

In an embodiment, such as the exemplary illustrations of FIGS. 3A-3C, the detector 20 includes a plurality of light sources 22 and/or a plurality of light sensing devices 24. In such embodiments the plurality of light sources 22 include at least a first light source 22a and a second light source 22b. Further, the first light source 22a and the second light source 22b may emit light at one or more wavelengths, and the one or more wavelengths may be the same, or alternatively, different. In an embodiment, the first light source 22a is configured to emit light having a wavelength associated with infrared light and the second light source 22b is configured to emit light having a wavelength associated with blue visible light.

With reference to FIGS. 3A-3C, the light emitted from each of the light sources 22 defines an emitter cone 40. Accordingly, in the illustrated, non-limiting embodiment, the first light source 22a emits a first emitter cone 40a, and the second light source 22b emits a second emitter cone 40b.

As best illustrated in FIG. 3C, each emitter cone 40 increases in diameter away from the surface 36 (shown in FIG. 1) of the detector 20. In the illustrated, non-limiting embodiment of FIGS. 3A-3C, the first emitter cone 40a is oriented at zero degrees and the second emitter cone 40b is oriented at a position of 90 degrees relative to the first emitter cone 40a. However, it should be understood that any suitable angle between the first and second emitter cones 40a, 40b is within the scope of the disclosure. The at least one light sensing device 24 similarly has a receiving cone 42 associated therewith. Further, the volume where each emitting cone 40 overlaps with the receiving cone 42 is defined as a sensing volume 44. In the illustrated, non-limiting embodiment, a first sensing volume 44a (FIG. 3B) is defined between the first emitter cone 40a and the receiving cone 42 and a second sensing volume 44b (FIG. 3C) is defined between the second emitter cone 40b and the receiving cone 42.

An example of a detector 20 as illustrated and described herein and a method of operating the detector 20 to detect the presence of a condition or event, such as smoke for example, is set forth in more detail in U.S. Provisional Patent Application Ser. No. 62/397,972 filed on Sep. 22, 2016, the entire contents of which is included herein by reference.

Figure 4:
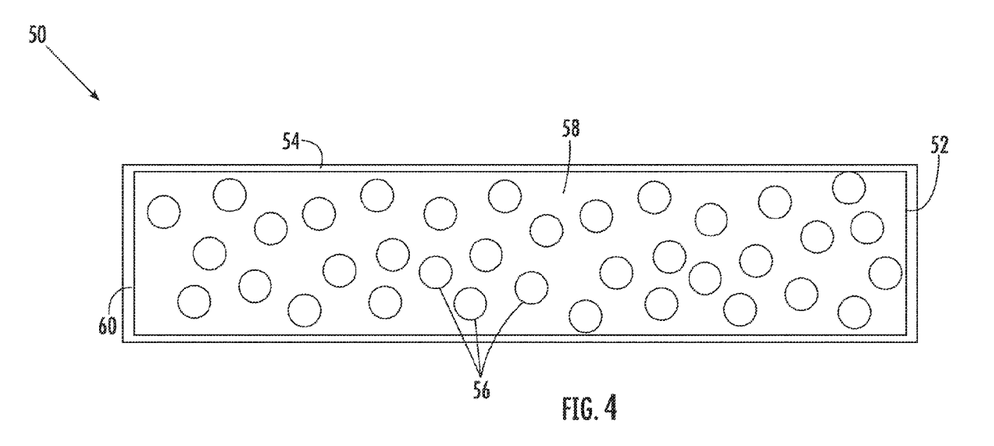
FIG. 4 is a cross-sectional view of a calibration block according to an embodiment.
Figure 5:
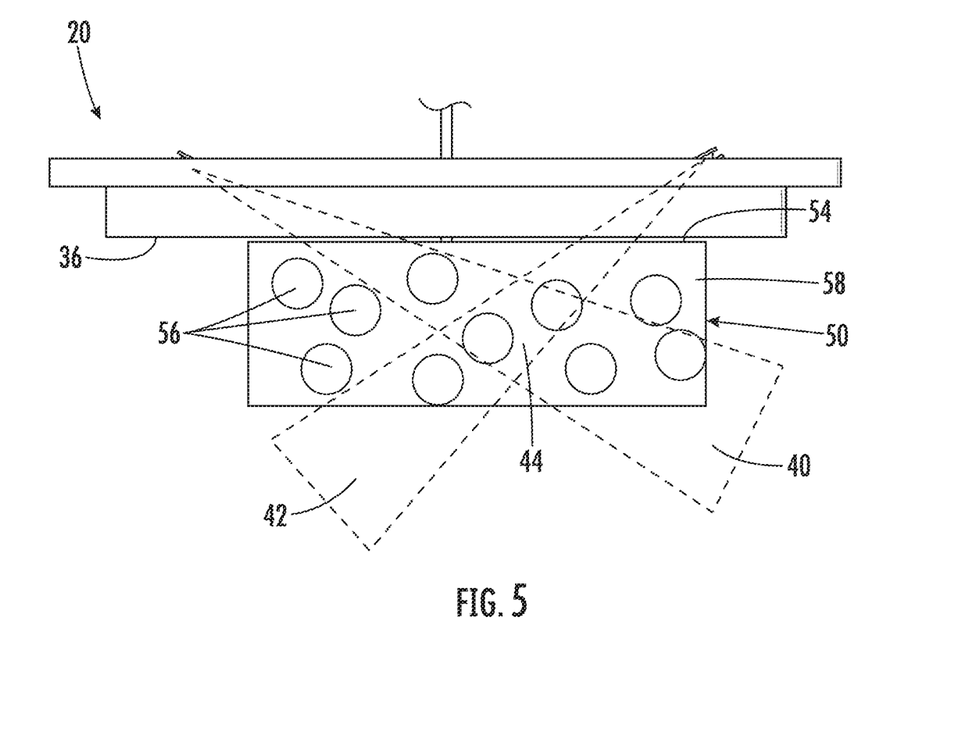
FIG. 5 is a cross-sectional view of a chamberless optical detector having a calibration block mounted thereto according to an embodiment.

With reference now to FIGS. 4 and 5, an example of a calibration block 50 for evaluating the operational sensitivity of a detector, such as detector 20 for example, is illustrated. The calibration block 50 includes a substantially solid body 52 having a primary surface 54 for mounting to or contacting a portion of the detector 20. In an embodiment, the primary surface 54 has a contour generally complementary to a surface of the detector 20, such as the second surface 36 for example, to maximize surface contact therewith and eliminate an air gap between the calibration block 50 and the detector 20. In the illustrated, non-limiting embodiment, the primary surface 54 of the calibration block 50 is a planar surface. In addition, the calibration block 50 may be formed having any suitable shape. For example, the body 52 may be generally circular and have a diameter less than or equal to the diameter of the detector 20. In another embodiment, the calibration block 50 is rectangular in shape. Because it is desirable to capture as much of the sensing volume as possible within the calibration block, in some embodiments, in embodiments where a sensing volume is defined beyond the periphery of the detector 20, the calibration block 50 may similarly extend beyond the detector 20.

Further, the cross-sectional thickness of the calibration block 50, as shown in FIG. 4, is substantially uniform throughout the entire body 52 of the calibration block 50. The overall size (i.e. diameter and thickness) of the calibration block 50 may be selected such that when the calibration block 50 is installed onto or adjacent a surface of the detector 20, the calibration block 50 overlaps or extends through the sensing volume 44 (where each emitting cone 40 overlaps with the receiving cone 42) defined between each light source 22 and each light sensing device 24 of the detector 20.

As shown, the calibration block 50 includes a plurality of particles 56 suspended or dissolved within a base material or solvent 58. In the illustrated, non-limiting embodiment, the base material 58 is an optically transparent material, such as an elastomer for example. The particles 56 may be selected from several suitable materials, including but not limited to titanium dioxide and carbon for example. The type, size and geometry of the particles 56, as well as the concentration of the particles 56 is selected to achieve desired scattering properties. In an embodiment, one or more parameters of the calibration block 50 are selected to achieve light scattering properties, also referred to herein as an "obscuration," representative of the presence of a light colored smoke. In another embodiment, one or more parameters of the calibration block 50 are selected to achieve an obscuration representative of the presence of a dark colored smoke. In yet another embodiment, one or more parameters of the calibration block 50 are selected to achieve a fluorescence response representative of a target contaminant.

In addition, one or more coatings 60 may be applied to all or a portion of the exterior surface of the calibration block 50. In an embodiment, an anti-reflective coating is applied to the primary surface 54 of the calibration block 50 to limit the reflection of light at the primary surface 54 of the calibration block 50. Alternatively, or in addition, other coatings, such as an absorptive paint for example, may be applied to one or more of the surfaces of the calibration block 50 to prevent back-reflection of the light emitted from the light source 22 and also to prevent ambient light from entering the calibration block 50.

Figure 6:
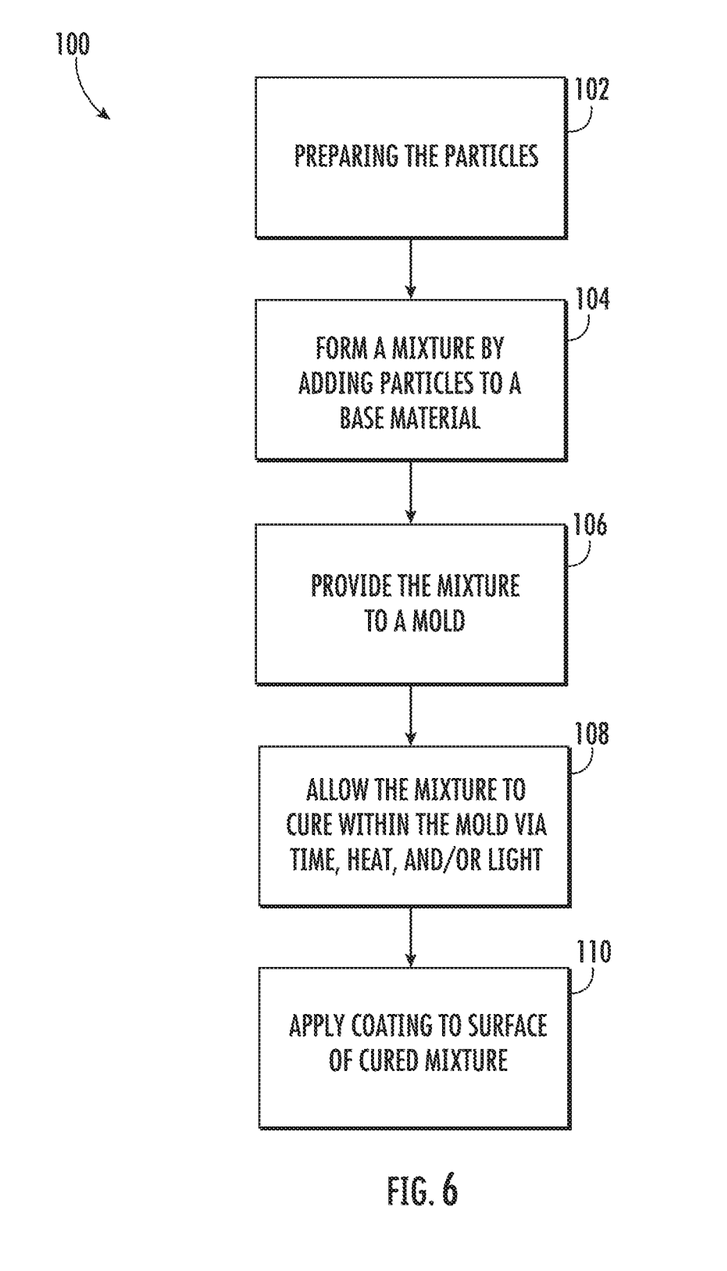
FIG. 6 is a method of forming a calibration block according to an embodiment.

With reference now to FIG. 6, an example of a method 100 of forming a calibration block 50 includes preparing the particles 56 of a specific material as shown in block 102, and forming a mixture by adding the diluted particles 56 to a base material 58, shown in block 104. Preparing the particles 56 as recited in step 102 may include one or more of (i) surface functionalization of the particles 56, (ii) diluting the particles 56 achieved by mixing the particles 56 with a liquid solution and (iii) filtering the nanoparticles suspended in the liquid solution before mixing the particle solution with the base material 58. Surface functionalization may include coating a surface of the particles 56 with a chemical to prevent the particles 56 from adhering to one another within the liquid solution. In an embodiment, filtering the particles 56 includes providing the particle-liquid solution to a filter or sieve to restrict the overall size of the particles 56 within the calibration block 50 and to further prevent agglomerates that may alter the light transmissive properties of the mixture. The base material 58 is viscous, but not as fluid as the liquid solution used for dilution.

In block 106, the mixture may then be provided to a mold, and in block 108, the mixture within the mold is allowed to cure, such as via time, and/or the application of light or heat thereto. In an embodiment, a curing agent is added to the mixture prior to forming the mixture within the mold to initiate the curing or solidification of the base material 58. Once the base material 58 has cured to form the calibration block 50, the one or more coatings 60 previously described herein may be applied to the desired surfaces of the calibration block 50, as shown in block 110. The method 100 described herein is intended as an example only, and it should be understood that any suitable method for forming a calibration block 50 having a desired obscuration is within the scope of the disclosure.

Figure 7:
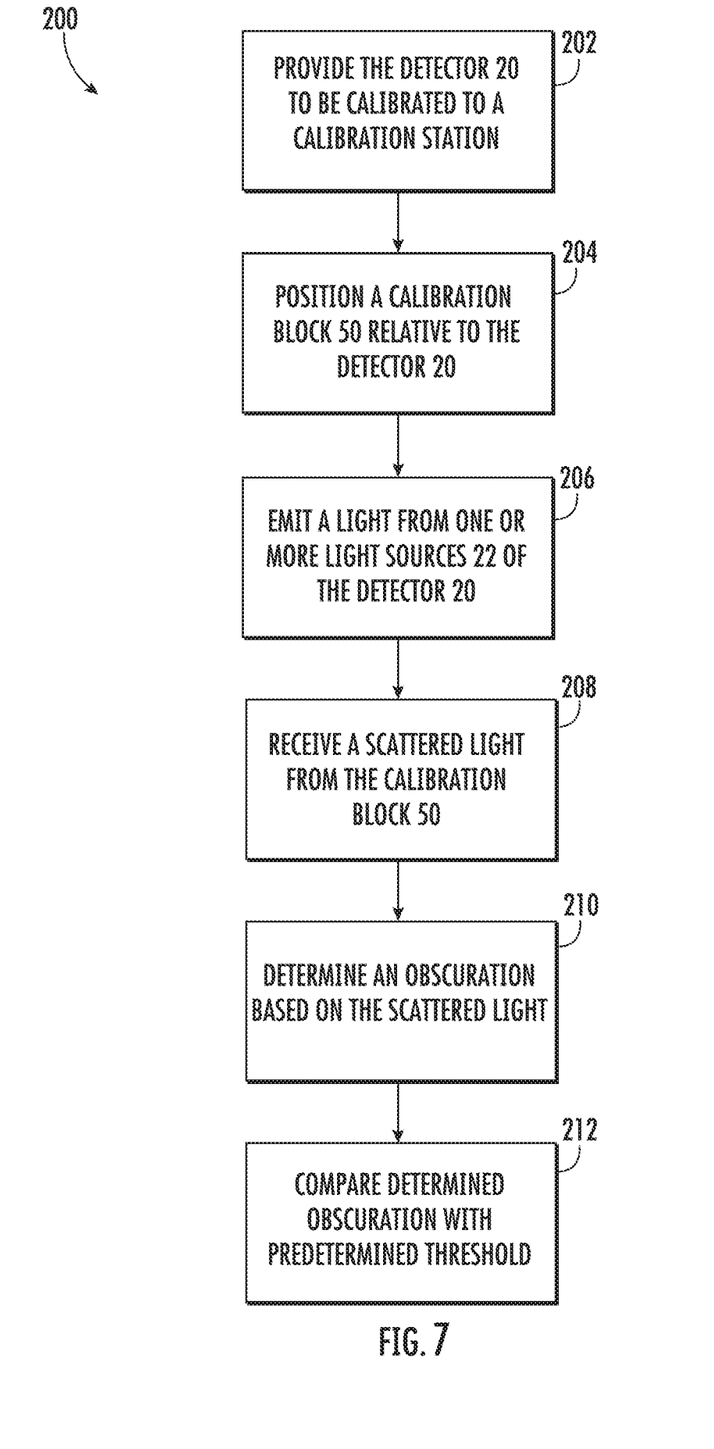
FIG. 7 is a method of performing a calibration operation of an optical detector according to an embodiment.

With reference now to FIG. 7, a method 200 of calibrating a detector, such as detector 20 is provided. In block 202, the detector 20 is provided to a calibration station on the production or manufacturing line. However, it should be understood that the method of calibrating a detector 20 need not be performed during manufacture of the detector. For example, calibration can be performed at any time prior to or during installation of the detector 20. In block 204, a calibration block 50 is positioned relative to the detector 20. In an embodiment, the calibration block 50 is positioned by arranging the primary surface 54 of the calibration block 50 in direct contact with the second surface 36 of the detector 20. In block 206, the detector 20 is operated such that at least one light source 22 within the detector 20 emits one or more pulses of light. The one or more pulses of light scatter as they pass through the calibration block 50. In block 208, the scattered light is received by at least one light sensing device 24 of the detector 20 and in block 210, the scattered light received by the at least one light sensing device 24 of the detector 20 is processed by a processing device 26.

If the processing device 26 determines a level of obscuration corresponding to the obscuration associated with the calibration block 50, then the detector 20 may be considered calibrated. In an embodiment, the detector 20 may be considered "calibrated" if the level of obscuration identified by the processing device 26 of the detector 20 is within a predetermined threshold of the obscuration of the calibration block (block 212). If the level of obscuration identified by the processing device 26 is outside of the allowable threshold, one or more parameters of the processing device 26 are adjusted. Examples of one or more parameters that may be adjusted include the light output intensity of the light sources 22, the detector sensitivity, the electronic gain of the circuitry associated with the light sensing device 24, and the scaling factor associated with the responsivity of the light sensitive device 24.

Further, in an embodiment, a plurality of calibration blocks having distinct obscurations may be used to perform a multiple point calibration of the detector 20. For example, a first calibration may be performed using a first calibration block 50 having a first obscuration. If the obscuration identified by the processing device 26 is outside of an allowable range, one or more parameters of the detector 20 may be adjusted and the calibration using the first calibration block may be repeated. In an embodiment, each calibration is repeated until the measured obscuration is within the allowable range.

Once the detector 20 is "calibrated" with respect to the first calibration block 50, i.e. a first calibration point is determined, the first calibration block 50 is removed and a second calibration block 50 is positioned adjacent the detector 20. The detector 20 is similarly operated to emit a light and receive a scattered light from the second calibration block 50. If the obscuration identified by the processing device 26 during this second calibration step is outside of an allowable threshold, one or more parameters of the detector 20 may be adjusted and the calibration using the second calibration block 50 may be repeated to achieve a second calibration point. Although this multiple point calibration is illustrated and described with respect to two different calibration blocks, it should be understood that a calibration process using any number of calibration blocks is within the scope of the disclosure. Further, calibration using the second calibration block may be performed at the same station, or alternatively, at another downstream station of the production line.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of calibrating a chamberless optical detector comprising:
   positioning a calibration block having a first obscuration relative to an exterior surface of the chamberless optical detector; and
   determining a first calibration point of the detector using the calibration block, wherein the first obscuration is representative of a type of smoke.

2. The method of claim 1, wherein determining the first calibration point of the detector further comprises:
   emitting a light from at least one light source of the detector;
   receiving scattered light from the calibration block at least one light sensing device;
   determining an obscuration based on the scattered light; and
   comparing the obscuration with an allowable range.

3. The method of claim 2, further comprising adjusting at least one parameter of the detector if the obscuration is outside the allowable range.

4. The method of claim 1, wherein positioning the calibration block relative to the optical detector includes mounting a primary surface of the calibration block in direct contact with a surface of the optical detector.

5. The method of claim 1, wherein positioning the calibration block relative to the optical detector includes mounting the calibration block within at least one sensing volume of the optical detector.

6. The method of claim 1, wherein the method of calibrating the optical detector occurs at a calibration station of a manufacturing line.

7. The method of claim 1, further comprising:
   positioning a second calibration block relative to the optical detector; and
   determining a second calibration point of the optical detector using the second calibration block.

8. The method of claim 7, wherein determining a second calibration point of the optical detector further comprises:
   emitting light from the at least one light source of the detector;
   receiving scattered light from the second calibration block at the at least one light sensing device;
   determining a second obscuration based on the scattered light; and
   comparing the second obscuration with a second allowable range.

9. The method of claim 7, wherein positioning the second calibration block relative to the optical detector further comprises removing the calibration block.

10. The method of claim 7, further comprising:
positioning a third calibration block relative to the optical detector; and
determining a third calibration point of the optical detector using the third calibration block.

11. A calibration block for use with a chamberless optical detector comprising:
a body positionable adjacent to an exterior surface of the chamberless optical detector to determine a calibration point of the chamberless optical detector, the body including a base material and a plurality of particles mixed within the base material such that the body has a known obscuration, wherein the plurality of particles are coated with a first coating to prevent the plurality of particles from adhering to one another within the base material;
wherein a second coating is applied to at least a portion of an exterior surface of the calibration block, the second coating being an anti-reflective coating.

12. The calibration block of claim 11, wherein the aerosolized particulates are representative of a light-colored smoke.

13. The calibration block of claim 11, wherein the aerosolized particulates are representative of a dark colored smoke.

14. The calibration block of claim 11, wherein the chamberless optical detector includes at least one sensing volume, and the calibration block is sized to extend through the at least one sensing volume.

15. The calibration block of claim 11, wherein a first surface of the calibration block is positionable in direct contact with the exterior surface of the chamberless optical detector, the first surface having a contour complementary to the exterior surface of the chamberless optical detector.

16. The calibration block of claim 11, wherein the base material is optically transparent.

17. The calibration block of claim 11, wherein a type, size and geometry of the plurality of particles are selected to achieve the known obscuration.

* * * * *